United States Patent [19]
Gittins et al.

[11] Patent Number: 5,961,651
[45] Date of Patent: *Oct. 5, 1999

[54] EVENT NOTIFICATION IN A COMPUTING SYSTEM HAVING A PLURALITY OF STORAGE DEVICES

[75] Inventors: Robert S. Gittins, Woodland Park; Dale Passmore, Colorado Springs, both of Colo.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/632,546

[22] Filed: Apr. 15, 1996

[51] Int. Cl.$^6$ .................................................... G06F 11/00
[52] U.S. Cl. .................................... 714/5; 714/6; 709/200
[58] Field of Search .............................. 714/7, 42, 3, 49; 710/260; 709/104, 100

[56] References Cited

U.S. PATENT DOCUMENTS

| 5,497,457 | 3/1996 | Ford ........................................... 714/15 |
| 5,504,858 | 4/1996 | Ellis et al. ................................... 714/52 |
| 5,566,337 | 10/1996 | Szymanski et al. ..................... 710/260 |
| 5,581,690 | 12/1996 | Ellis et al. ................................... 714/7 |
| 5,617,425 | 4/1997 | Anderson .................................... 714/5 |
| 5,708,668 | 1/1998 | Styczinski . |

FOREIGN PATENT DOCUMENTS

| 0 738 976 | 10/1996 | European Pat. Off. . |
| WO94 15293 | 7/1994 | WIPO . |

OTHER PUBLICATIONS

IBM Technical Disclosure Bulletin, vol. 36, No. 9B, Sep. 1993, Armonk, NY, U.S., pp. 101–02, "Dynamic Operator Message Management".

IBM Technical Disclosure Bulletin, vol. 34, No. 5, Oct. 1991, Armonk, NY, U.S., pp. 245–46, "Reliability, Availability, Serviceability Daemon".

*Primary Examiner*—Majid A. Banankhah
*Attorney, Agent, or Firm*—James A. Pinto; William J. Kubida; Holland & Hart LLP

[57] ABSTRACT

In a computing system having a plurality of storage devices, notification of an application program of a change of state in a storage device so that corrective action can be taken. A notification module creates and maintains an event queue for storing events corresponding to changes in the state of the storage devices. The notification module indicates to the application programs that events are in the queue. The queue conditions are monitored by the notification for queue maintenance.

13 Claims, 9 Drawing Sheets

EVENT NOTIFICATION IN A COMPUTING SYSTEM HAVING A PLURALITY OF STORAGE DEVICES

BACKGROUND OF THE INVENTION

1. Field of the Invention

The present invention relates, in general, to the field of computers and computer storage devices. More particularly, the present invention relates to notifying application programs in a computing system of changes in the state of storage devices or metadevices of the computing system.

2. Description of Prior Art

Conventional computing systems used for data processing and storage of large amounts of data typically utilize numerous physical devices, such as disk drives, for storage of information. To reduce the complexity of access to the storage devices, the physical storage devices are often arranged into metadevices or logical devices.

Physical disk drives can fail in numerous ways through, for instance, a disk controller failure, a disk head failure, a disk platter failure, a failure in the cable connecting the disk drive to the computing system, etc. While some of the failures of a disk drive can be recovered from, other failures require that the storage device be removed from the computing system and repaired.

In order to improve the integrity of data storage in these computing systems during a disk failure, a variety of data replication techniques have been developed. RAID (redundant array of inexpensive disks) disk arrays including disk mirrors (RAID-1), disk stripes (RAID-0), and RAID-5 arrays, as well as disk sets, concatenated devices, and spare disks can all be used to enhance the reliability of information storage and retrieval in a computing system. For example, a simple disk mirror is comprised of two disks, each disk having the same data stored therein. If one of the disks in the mirror fails, then the other disk is used to satisfy a read or write request.

Conventional data replication methods generally mask the failure of any single physical disk from the computing system because data errors resulting from disk failures are automatically corrected before any erroneous data is passed to the application programs. Because conventional replication techniques automatically correct and mask any physical disk failure from the computing system, user-level applications running on the computing system are generally unaware that a physical disk of the computing system has failed.

Importantly, as the number of storage device errors increases in a computing system, the more likely the computing system will subsequently suffer a catastrophic storage device error resulting in loss of data. Although conventional replication techniques can detect and correct a single disk failure, a subsequent second disk failure generally results in a catastrophic error condition wherein data stored in the replicated storage device is lost and unrecoverable. For instance, a simple disk mirror comprised of two physical disks can withstand a failure in a single disk, but a failure in both disks results in lost data. Likewise, in a RAID-5 disk array, a failure of more than one disk results in lost data.

It is therefore beneficial for the computing system to provide information in real-time regarding the condition of the storage devices. While conventional computing systems may provide a limited amount of disk information to a console connected to the file server, these messages are often directed solely to this console. The console is generally located in a machine room housing the file server and is rarely monitored in real-time by a user or a system administrator.

Furthermore, notification of device errors in conventional computing systems is generally limited to devices failure information.

SUMMARY OF THE INVENTION

In accordance with this invention, the above problems have been solved in a method implementation of the invention by notifying an application program of a change of state in the storage devices of a computing system. Upon receiving a request for creating an event queue from the application program, an event queue is created that stores an event generated by the storage devices corresponding to the change of state of the storage devices. The event queue is created with a queue header, the queue header containing a queue name identifying the event queue, a maximum queue size, a set of queue flags and pointers, and a process identification that identifies the application program which requested the creation of the event queue. Upon successful creation of the queue, the application module is notified that the event queue was successfully created.

Upon an event generated by a storage device, the event is placed in the event queue and passed to the application program if appropriate. Events are reported to the application in two ways. If the application program is waiting for incoming events, then the application program is immediately notified of the new event. Alternatively, the application could remove events from the queue at its own convenience.

If the event queue has exceeded a predetermined size limit, the oldest event stored in the queue is discarded to create space for storing the event, and the application is informed that information has been lost.

The above computer implemented steps in another implementation of the invention are provided as an article of manufacture, i.e., a computer storage medium containing a computer program of instructions for performing the above described steps.

In a machine implementation of the invention, an apparatus for notifying an application program of a change of state in a storage device has an event queue that stores an event generated by the storage device corresponding to the change of state of the storage device. A notification module receives the event from the storage device and places it in the event queue. The module then passes the event to the application program in response to a request from the application program to create an event queue. The notification module is also adapted to receive application generated events corresponding to the configuration of the storage devices in the computing system.

The great utility of the present invention is that all state changes of a metadevice or storage device are passed in real-time to the system administrator or system operator, or to an application program, for monitoring and possible immediate corrective action.

Still another utility of the present invention is to permit application programs to establish queues of information, maintained by the notification module, relating to the state changes of the metadevices or storage devices in a computing system. Since the queues are maintained by the notification module, the application program is relieved of the administrative burden of servicing each change in state of the metadevices in the computing system.

Still another utility of the present invention is to provide a centralized computing resource for collecting and maintaining all events generated by the metadevices for later use by application programs.

Still another utility of the present invention is to permit multiple application programs to establish queues for changes in the state of the metadevices in the computing system.

Still another utility of the present invention is to permit the destruction of a queue after the termination of the application program which requested the creation of the queue, thereby freeing system resources.

The foregoing and other useful features and advantages of the invention will be apparent from the following more particular description of a preferred embodiment of the invention as illustrated in the accompanying drawings.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

Figure 1:
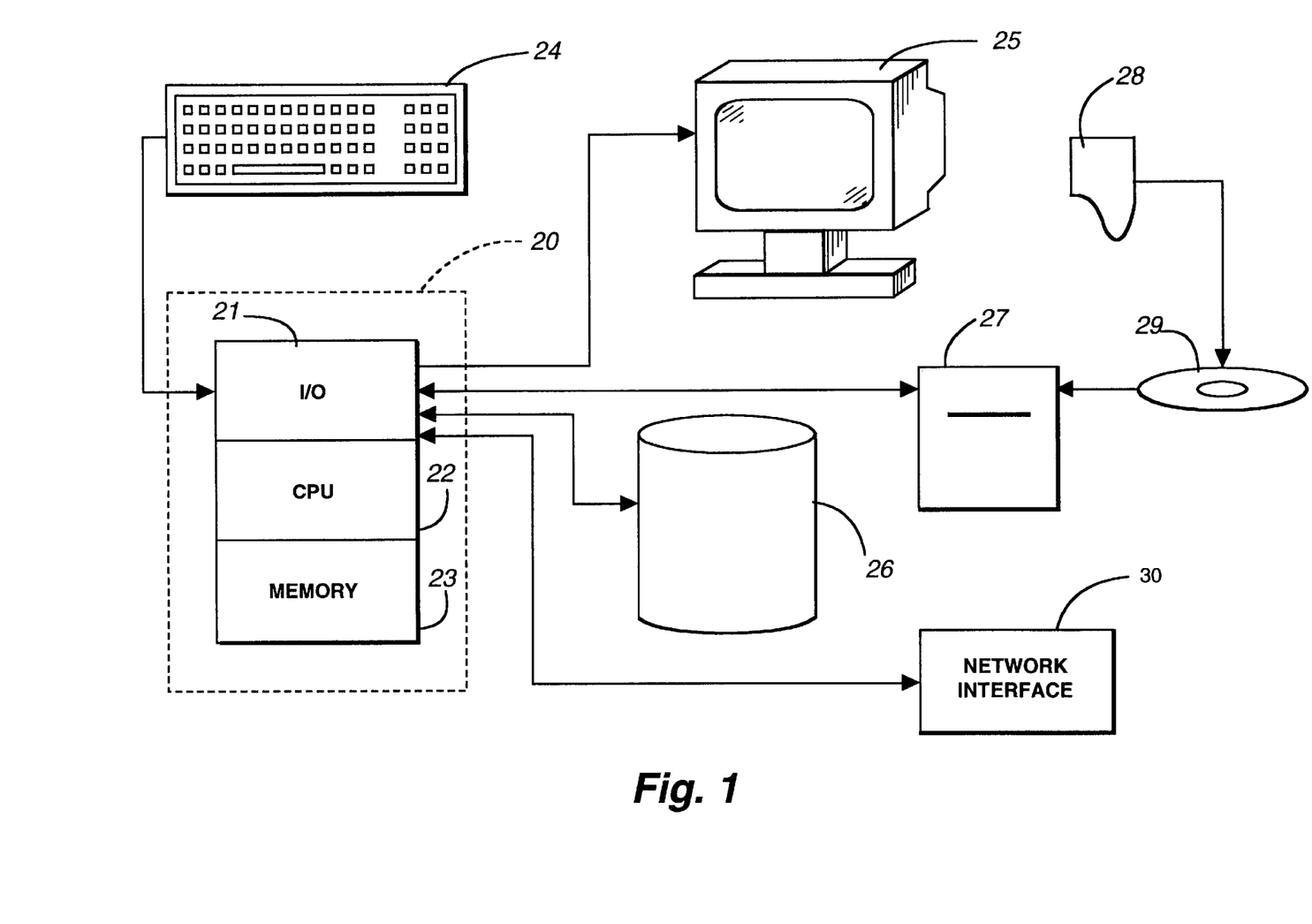
FIG. 1 illustrates a computing system to perform the computer implemented steps in accordance with the invention.

The operating environment, in which the present invention is used, encompasses a standalone computing system as well as the general distributed computing system. In the distributed computing system general purpose computers, workstations, or personal computers are connected via communication links of various types, in a client-server arrangement, wherein programs and data, many in the form of objects, are made available by various members of the system. Some of the elements of a standalone computer or a general purpose workstation computer are shown in FIG. 1, wherein a processor 20 is shown, having an input/output (I/O) section 21, a central processing unit (CPU) 22 and a memory section 23. The I/O section 21 is connected to a keyboard 24, a display unit 25, a disk storage unit 26, a network interface 30, and a CD-ROM drive unit 27. The CD-ROM unit 27 can read a CD-ROM medium 29 which typically contains programs 28 and data. The computer program products containing mechanisms to effectuate the apparatus and methods of the present invention may reside in the memory section 23, or on a disk storage unit 26, or on the CD-ROM 29 of such a system. Examples of such systems include SPARC systems offered by Sun Microsystems, Inc., personal computers offered by IBM Corporation and by other manufacturers of IBM-compatible personal computers, and systems running the UNIX operating system or Solaris™0 operating system.

Figure 2:
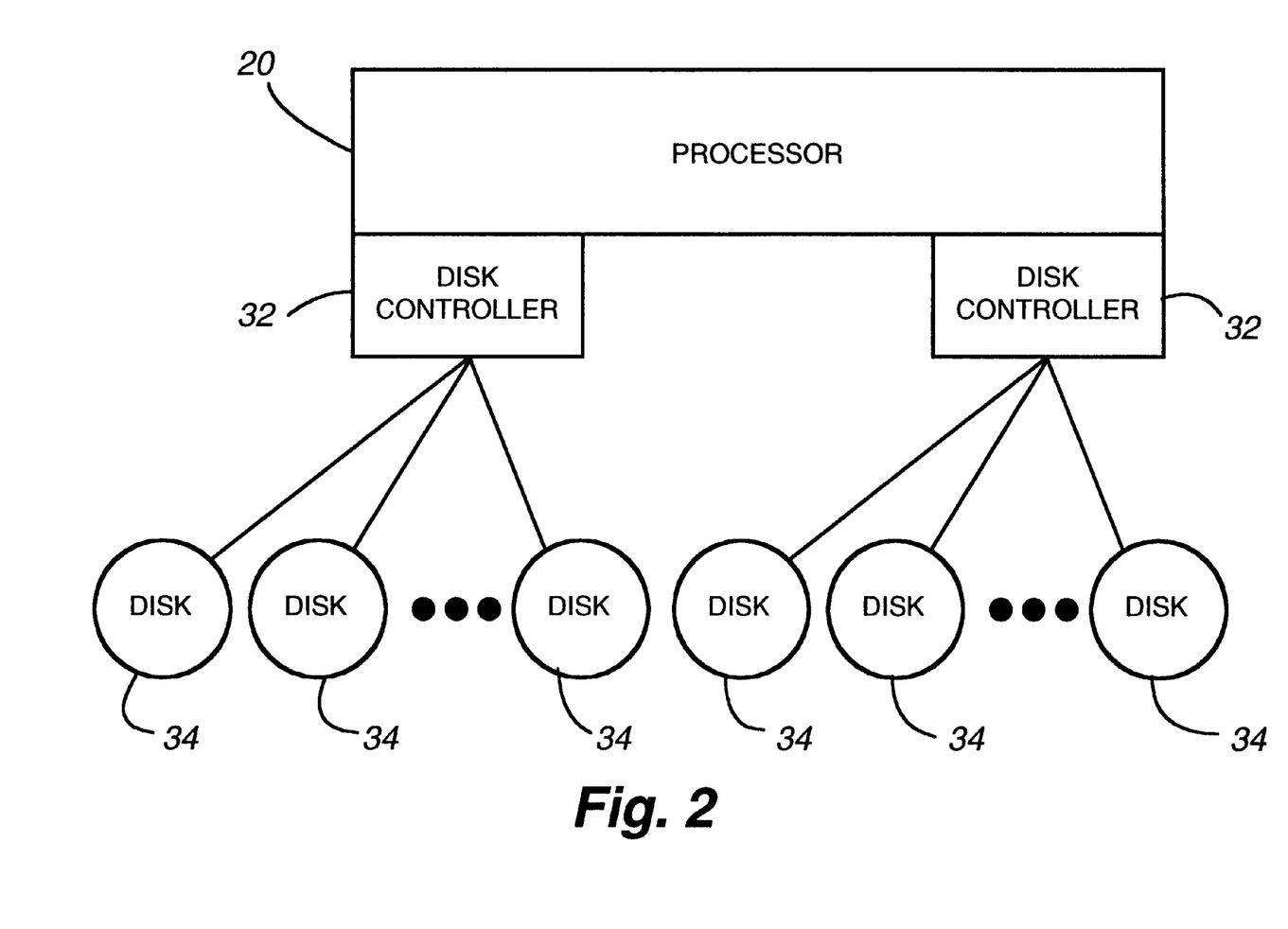
FIG. 2 illustrates a computing system having a plurality of physical storage devices.

Disk storage unit 26 of FIG. 1 can be comprised of a plurality of physical disk drives in order to increase the capacity, reliability, and performance of the computing system. FIG. 2 shows a plurality of disks 34 connected to processor 20 by disk controller 32. The plurality of disks 34 can be arranged into various metadevices depending on the desired performance.

For example, a disk mirror is a duplicative set of drives wherein each drive in the mirror contains the same information as other drives in the mirror. When a single drive of the mirror fails, the mirror is still able to satisfy any read or write request to the mirror through the remaining disk.

A RAID metadevice is an array of disks which contain data and parity information such that data contained on a failed drive can be reconstructed using the remaining drives in the array.

Hot spares are a set of drives which are available to replace automatically any failed drive of another metadevice in the computing system. For instance, if a hot spare drive is available, it can replace a failed drive in a mirror or RAID disk array.

A typical computing system for applications using large amounts of data (i.e., an accounting database) can utilize hundreds of disk drives, sometimes even up to a thousand drives. These computing systems can utilize a combination of metadevices including disk mirrors, RAID-5 disk arrays, disk stripes, concatenated disks, and hot spares. Hence, the plurality of drives 34 (FIG. 2) can be arranged into a variety of metadevices depending upon the desired performance of the storage devices in the computing system.

Figure 3:
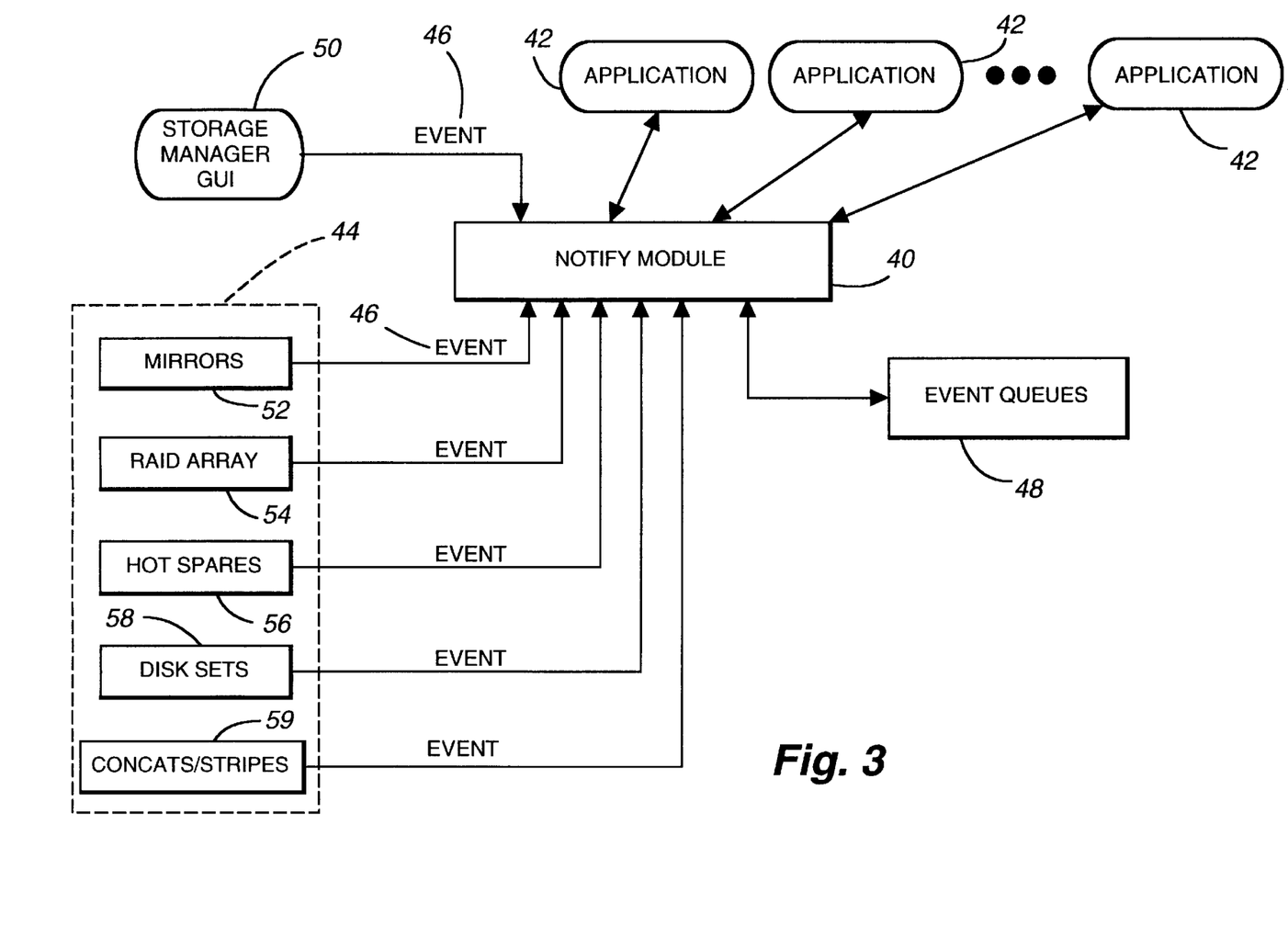
FIG. 3 is a block diagram of the preferred embodiment of the present invention.

FIG. 3 illustrates the preferred embodiment of the present invention. Notify module 40 establishes event queues 48 responsive to requests by application program 42 to queue events 46 generated by metadevices 44. Notify module 40 is capable of establishing separate event queues for multiple applications.

Events 46 can be generated either by metadevices 44 or by a user level program such as a storage device manager graphical user interface (GUI) 50. Storage manager 50 could be provided with the ability to affect the configuration of the metadevices (i.e., partition the disks). Therefore, notify module 40 is adapted to receive events generated by storage manager 50 which affect the configuration of metadevices 44. In this manner, notify module 40 can track in real time changes in the state of the metadevices 44 or changes in the configuration of the metadevices made at the application level.

As shown in FIG. 3, metadevices 44 can contain mirrors 52, a RAID array 54, hot spare disks 56, disk sets 58, and concatenated/striped disks 59. Metadevice 44 could also contain other forms of storage devices depending on the particular implementation chosen for the computing system.

Notify module 40 is adapted to place in queue 48 incoming events 46 from either metadevice 44 or an application 50. The metadevice 44 or program 50 transmits the event to the notify module 40 for processing therein.

An event 46 can be broadly defined to include any change of state in the underlying metadevice. An event can be as simple as a change in the state of a metadevice. For example, a drive failure could constitute an event to be processed by notify module 40. Other examples of possible events could include when a metadevice is created or deleted, or when the size of a metadevice is changed, or when a new physical drive (i.e., a hot spare) is used in a metadevice. Also, any changes in the configuration of the devices (i.e., which drives comprise a metadevice) can be used as events to trigger messages from the metadevices to the notification module. While the definition of an event is a matter of choice dependent upon the particular implementation, greater amount of details provided from the metadevices to the application programs through the notify module is generally beneficial.

An event can be characterized by a set of variables including a tag, a time stamp, a set indicator, a device indicator, an event description, and a user value. The tag indicates the type of metadevice in which the event occurred, while the time stamp indicates the time when the event occurred. The set indicator could show in which disk set, if any, the event occurred. The device indicator shows in which particular metadevice the event occurred, while the event indicator contains the actual occurrence or state change in the metadevice. The user field distinguishes between an event generated by an application versus an event generated by a metadevice in the kernel of the computing system.

The notify module 40 (FIG. 3) maintains event queues 48 for access by application programs 42. Notify module 40 could be polled by application programs 42 for events captured in the queue. Alternatively, notify module 40 can notify the application upon receipt of an event in a manner similar to an interrupt.

Figure 4:
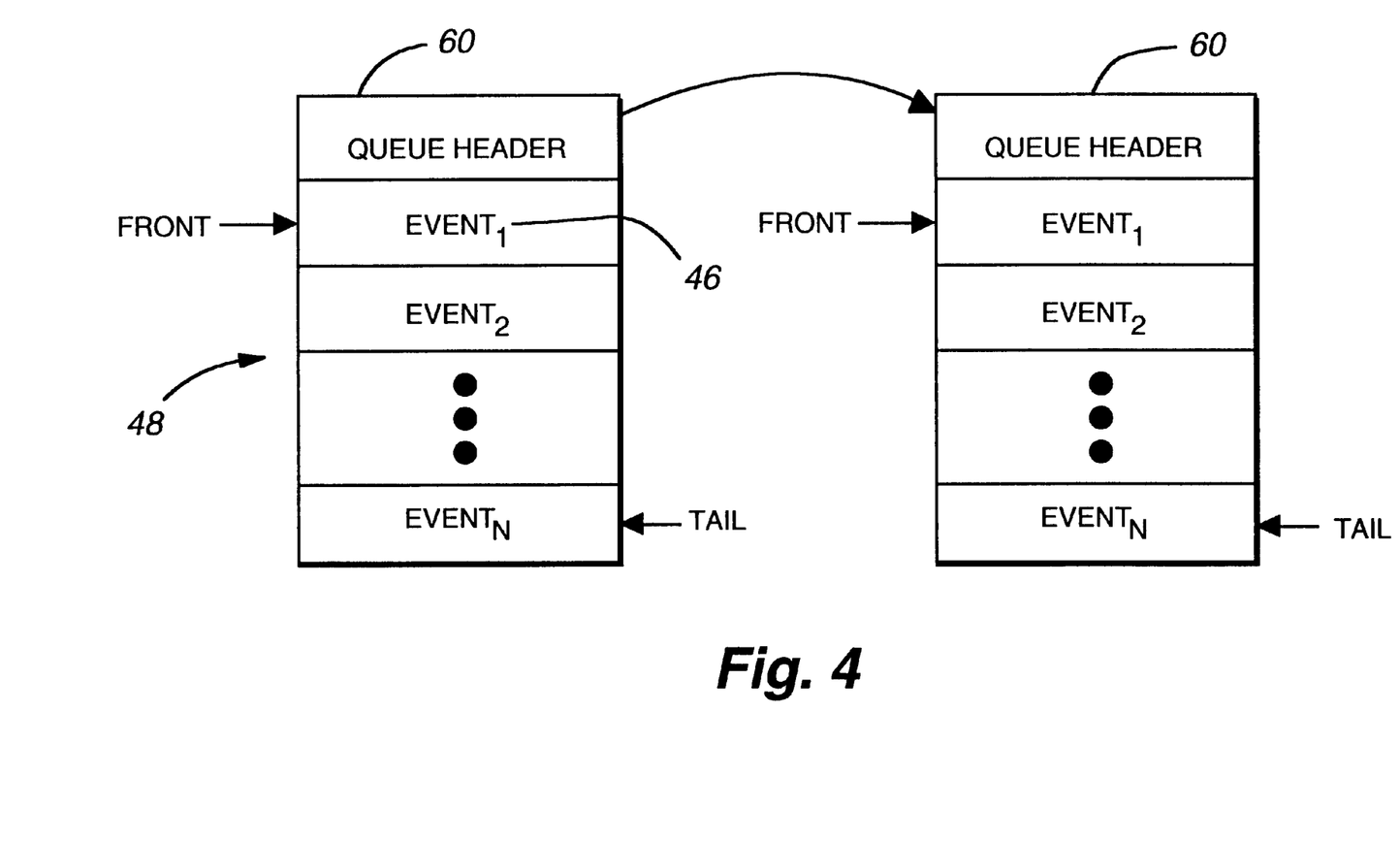
FIG. 4 illustrates the structure of an event queue in the preferred embodiment of the present invention.

Referring to FIG. 4, event queue 48 is shown containing a queue header 60 and events 46. While the structure of the queue is a matter of choice dependent upon the particular implementation in the computing system, the preferred embodiment of the present invention utilizes a link list of first-in first-out (FIFO) queues.

Queue header 60 of queue 48 contains elements which define the characteristics of queue 48, including the name and size (number of items in the queue) of the queue. The queue header could also contain a process ID variable corresponding to the process ID of the application program which requested the creation of the particular queue. The queue header could also contain a set of flags, condition variables, and queue pointers. In the preferred embodiment of the present invention, flags are maintained to indicate error conditions such as an excessive queue size or a lack of system memory. Condition variables can indicate the manner of desired notification to the application program. For instance, if the application program is waiting for the notify module to pass an incoming event, then an appropriate condition variable can so indicate.

Under the preferred embodiment of the present invention, a queue can be created as a permanent queue or a non-permanent queue. A permanent queue is a queue maintained persistently regardless of the state of the application program which created the queue. In contrast, a non-permanent queue is a queue which can be deleted upon the termination of the application program which created the queue.

As illustrated in FIG. 4, the preferred embodiment of the present invention utilizes a link list for management of multiple queues maintained by notify module 40. Each queue 48 would contain information pointing to the next queue maintained by module 40. When a queue is added or deleted by notify module 40, the link list of queues is appropriately updated. While the design of the queue is a matter of choice dependent upon the particular implementation, a first-in first-out (FIFO) queue offers the benefits of providing the application program with a linear history of events generated by the metadevices. However, the maximum size of the FIFO queue should be established so as to prevent queue 48 from consuming excessive system resources. The maximum queue size can be determined by the expected number of events generated by a catastrophic failure in the particular computing system. For instance, if in a computing system having a single RAID-5 array, 512 events may be the expected number of events generated by a failure of two or more of the physical drives of the array. Of course, the number of expected events will be dependent upon the definition of events for a particular metadevice in the computing system.

Figure 5:
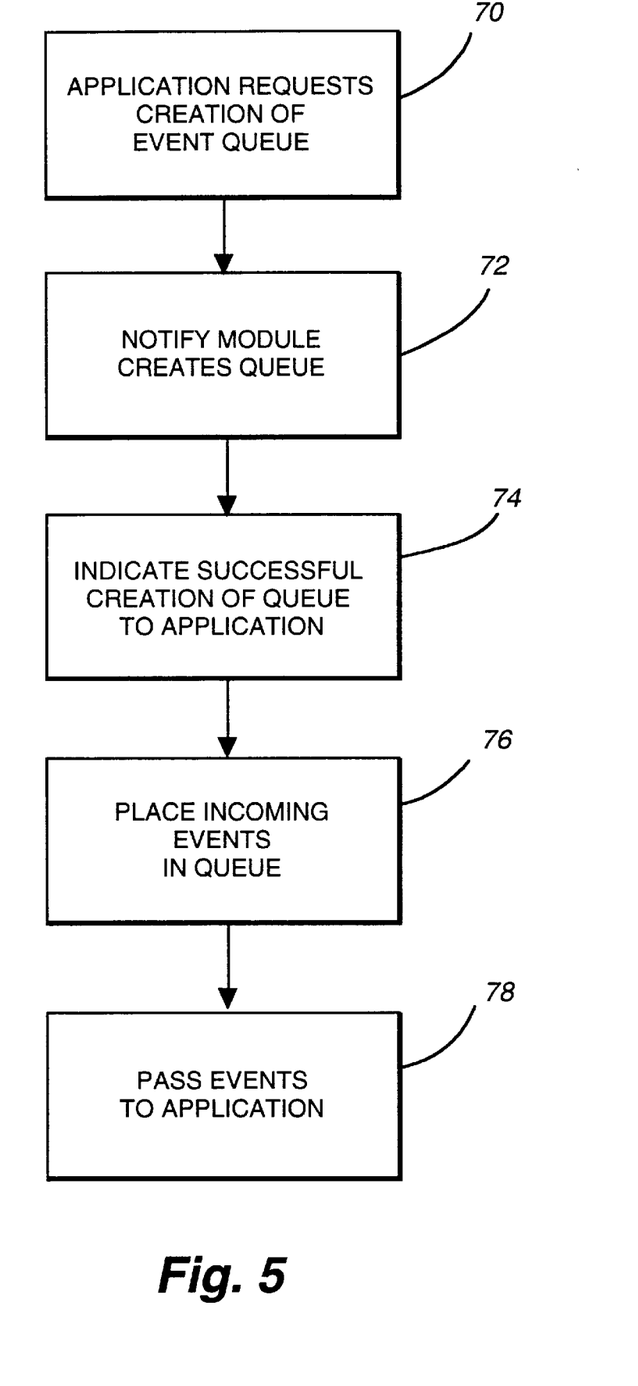
FIG. 5 illustrates the logical operations performed by the preferred embodiment of the present invention.

FIG. 5 illustrates the overall flow of operations of the preferred embodiment of the present invention. Operation 70 requests the creation of an event queue by an application program in the computing system. Responsive to operation 70, operation 72 creates the queue through the notify module, and operation 74 indicates to the application program the successful creation of the queue. Responsive to an event generated by a metadevice or by an application level program, operation 76 places incoming events in the event queue, and operation 78 passes the event stored in the queue to the application program. The details of operations 72–78 are described in greater detail with reference to FIGS. 6–8.

Figure 6:
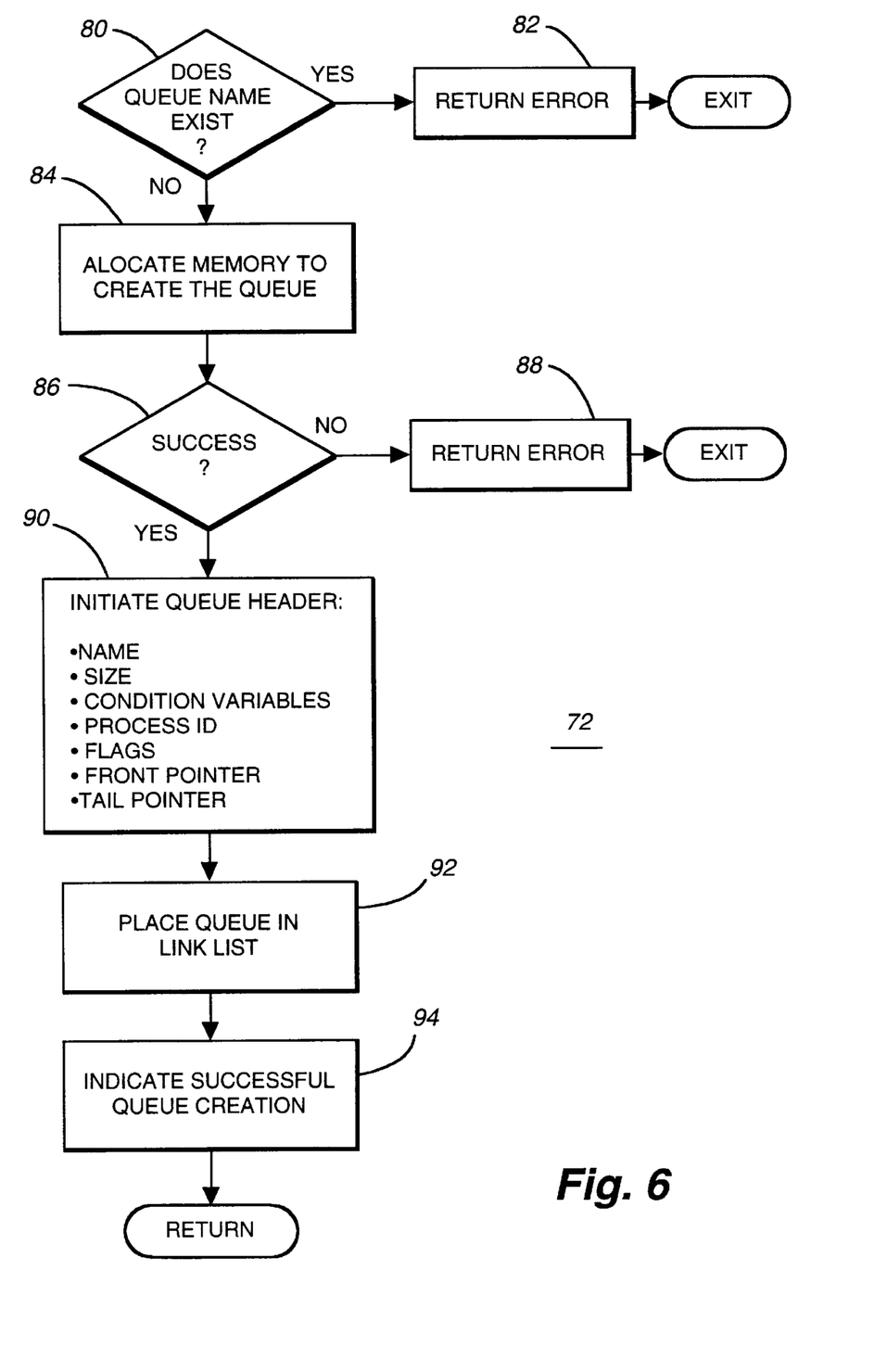
FIG. 6 illustrates the logical operations for creating an event queue according to the preferred embodiment of the present invention.

FIG. 6 illustrates the logical operations for creating an event queue responsive to an application program's request. Operation 80 determines if the name for the event queue provided by the application program already exists. If the name exists, then operation 82 indicates this error to the application program and the queue is not created. Otherwise, operation 84 proceeds to allocate sufficient memory to create the event queue. The minimum amount of memory required to create the queue is approximately the size of the queue header, since the queue will be initialized to be empty. Operation 86 determines if the memory allocation was successful and operation 88 returns an error to the application if the memory allocation was unsuccessful.

The queue header is then initialized by operation 90. Header initialization operation 90 includes writing the queue name into the header, copying the process ID obtained from the application into the header, and initializing all variables, flags, and pointers maintained in the queue header. Operation 92 then places the queue in the link list of queues maintained by the notify module 40, while operation 94 indicates to the application program that the event queue was successfully created.

Figure 7:
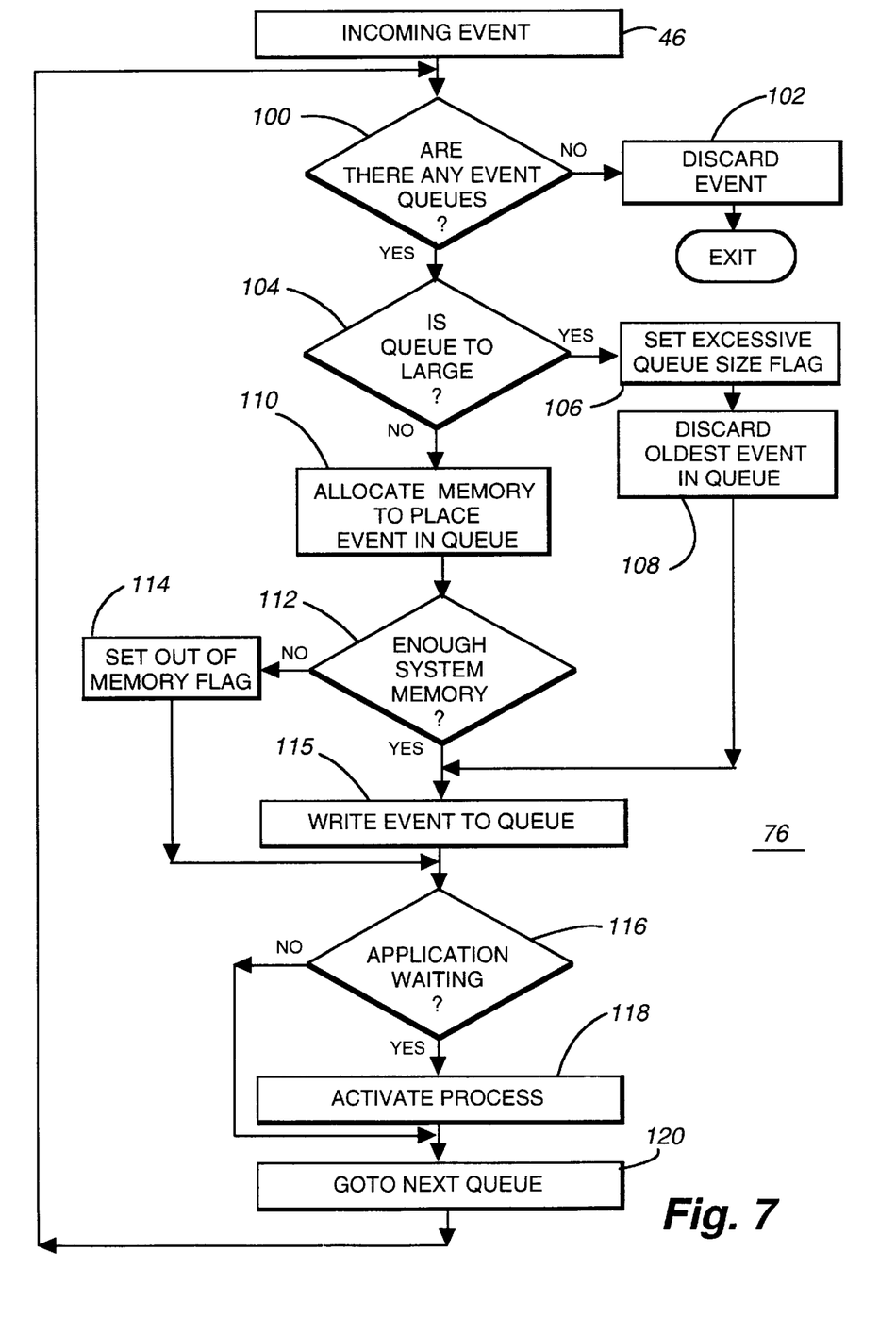
FIG. 7 illustrates the logical operations for processing an event according to the preferred embodiment of the present invention.

FIG. 7 illustrates the logical operations for processing, by the notify module 40 (FIG. 3), of an incoming event 46. As previously discussed, an event can be generated either by an application such as storage manager 50 (FIG. 3) or by a kernel event caused by a change of state of a metadevice 44 (FIG. 3).

Referring to FIG. 7, responsive to an incoming event 46, operation 100 determines if any event queues exist for storing the incoming event. If no event queues have been created, then operation 102 discards the event for lack of an event queue. Otherwise, operation 104 determines if the queue size has exceeded its predetermined maximum size limit.

If the queue size has exceeded its predetermined size limit, operation 106 sets a flag indicating an excessive queue size. Because it is desirable to place the most recent incoming event in the queue for use by the application, operation 108 creates space in the queue by discarding the oldest event in the queue. In this manner, the queue size is not increased, yet the most recent event can be stored in the queue by operation 115, described below.

If the queue size in not excessive, then operation 110 allocates memory to place the event in the queue. Operation 110 is needed because under the preferred embodiment of the present invention, a FIFO queue is utilized whose size varies based on the number of events stored in the queue.

Operation 112 determines if there is enough system memory for storage of this event in the queue. If there is insufficient system memory, then operation 114 sets a flag indicating that the computing system has reached its memory capacity, and the event is not placed in the event queue.

If there is sufficient system memory as determined by operation 112, operation 115 writes the event to the queue for subsequent passage to the application program.

Operations 116 and 118 of FIG. 7 interact with operations 146 and 150 of FIG. 8, as will be explained below. Operation 116 determines if an application is waiting for an event to be received by notify module 40. If an application is waiting, then operation 118 activates that application such that application processes the event now stored in the event queue (FIG. 8).

Upon completion of the logical operations contained in FIG. 7 to process an incoming event, operation 120 effectuates these operations in the next event queue maintained in the link list. In this manner, the same events will be stored in all of the event queues maintained in the link list, subject to the characteristics of each event queue (i.e., queue size), available system memory, and whether the application has fetched any events out of a particular event queue.

Figure 8:
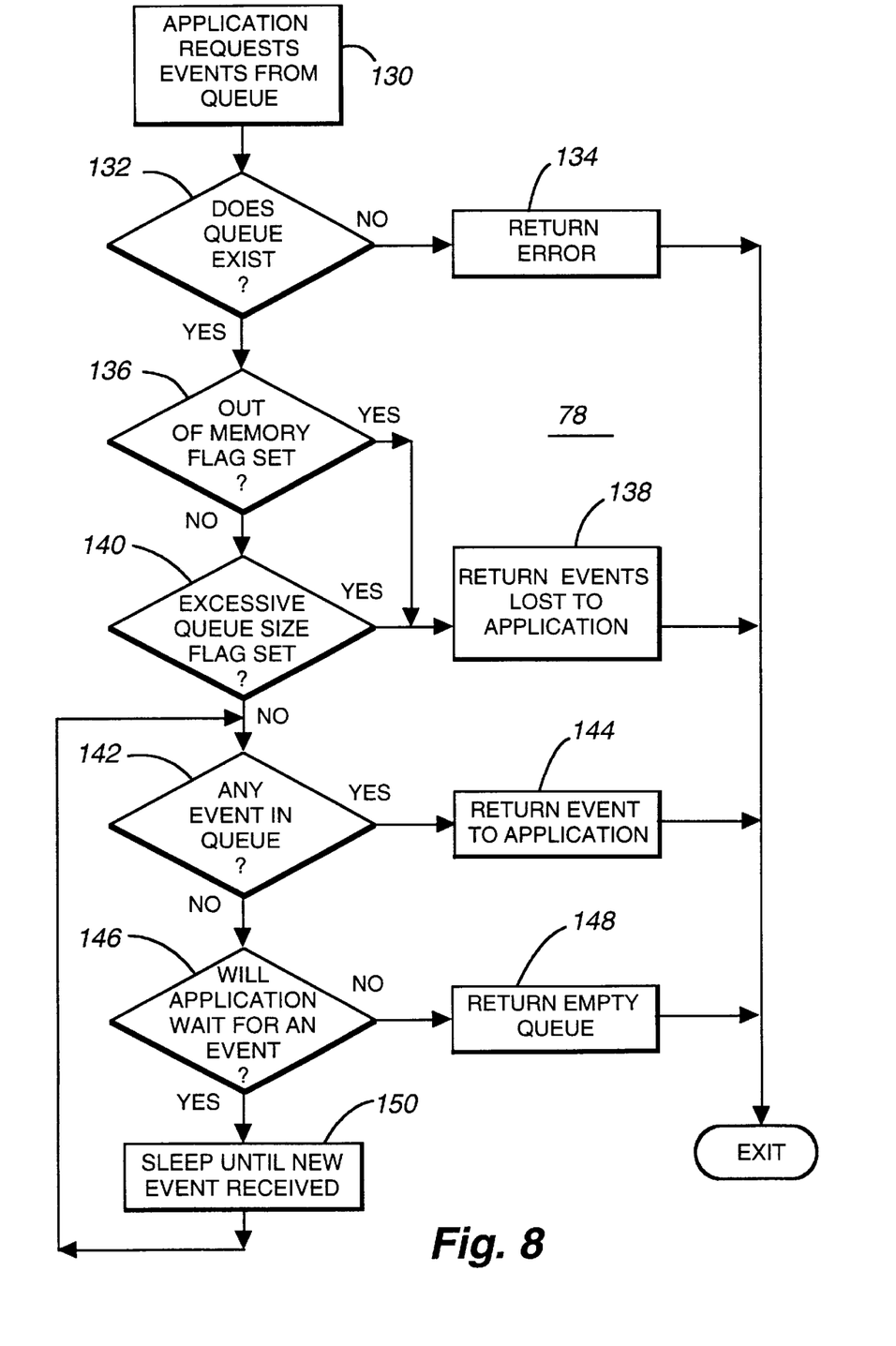
FIG. 8 illustrates the logical operations for reporting events contained in the event queue to the application program according to the preferred embodiment of the present invention.

FIG. 8 illustrates the logical operations for passing an event from notify module 40 (FIG. 3) to an application program 42 (FIG. 3). Operation 130 requests events from the event queue. Responsive to operation 130, operation 132 determines if a queue exists. If no event queue exists, operation 134 reports an appropriate error to the application program.

Because of the possible errors including lack of system memory and excessive queue size detected by operations 106 and 112 respectively (FIG. 7), the notify module indicates such conditions to the application program in the preferred embodiment of the present invention. Operation 136 determines if the out of memory flag is set, while operation 140 determines if the excessive queue size flag is set. If either of these flags are set, then operation 138 reports to the application program that events have been lost by the notify module. In other words, the event queues no longer contain an accurate linear history of events of the metadevices.

If no error flags have been set, then operation 142 determines if there are any events in the queue for reporting to the application program. If an event exists in the queue, then operation 144 returns the event to the application. If there are multiple events present in the queue, the application program can fetch each individual event out of the queue, using the operations of FIG. 8, until the event queue is empty.

If there are no events in the queue as determined by operation 142, then operation 146 determines if the application will wait for an event to occur. If so, then at operation 150 the application sleeps until a new event is received. As previously described, operations 116 and 118 of FIG. 7 awake a sleeping process upon the receipt of a new incoming event. Referring to FIG. 8, when the application is revived, control passes to operation 142 so that the event can be returned to the application by operation 144. In this manner, applications are instantaneously notified of the occurrence of events which have occurred in the metadevices of the computing system.

If there are no applications waiting for events and there are no events in the event queue, then operation 148 indicates to the application program that the event queue is empty.

Figure 9A:
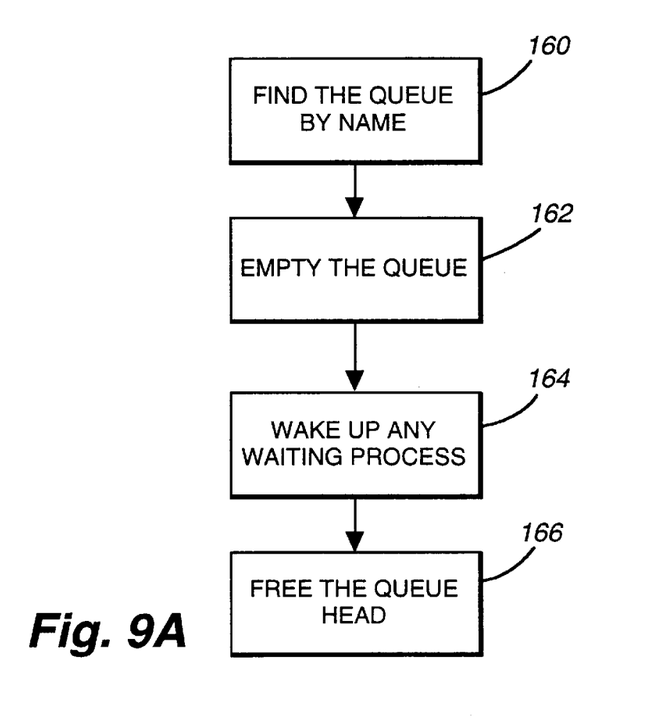
FIGS. 9A and 9B illustrate the logical operations for deleting an event queue according to the preferred embodiment of the present invention.

FIG. 9A illustrates the operations for removing a particular event queue from the computing system. Operation 160 locates the particular queue to be removed by name. Operation 162 empties the contents of the event queue so as to clear the memory locations occupied by the events stored in the queue. Operation 164 awakes any processes which were waiting for an event to occur. Finally, operation 166 releases the queue head so that the memory locations occupies thereby are again available.

Operations 160–166 can be initiated by the application which initially requested the creation of the particular event queue. Alternatively, a process could be created to monitor the existence of application programs which created particular event queues. If a given application has terminated, then the particular event queue can be deleted from the computing system if the event queue was designated as a non-permanent queue.

Figure 9B:
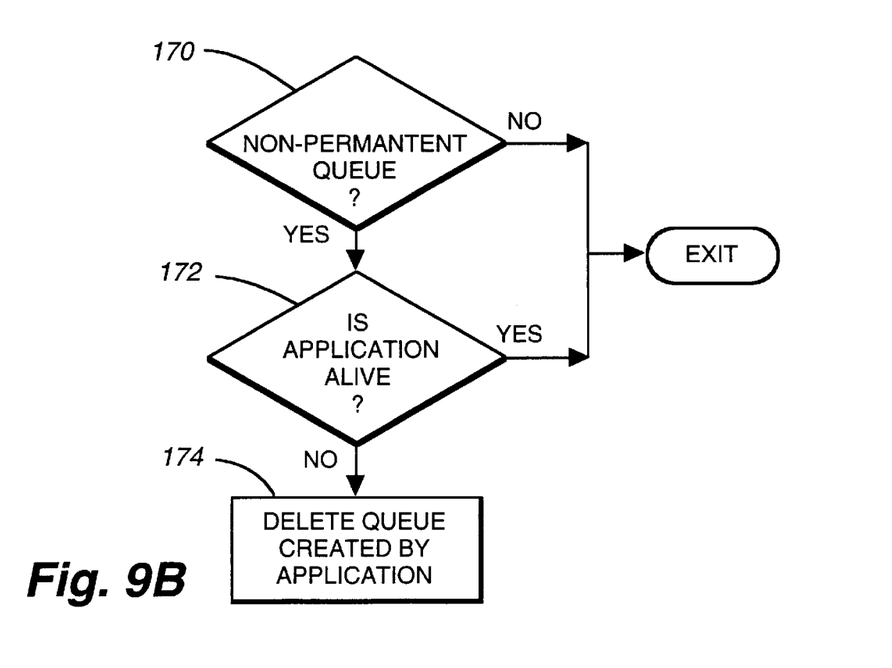

FIG. 9B illustrates these logical operations. Operation 170 examines a particular event queue to determine if the event queue can be deleted. If the event queue is a non-permanent event queue, then the event queue can be deleted from the computing system if it is no longer in use. Operation 172 determines if the application which created the event queue is still active. Using the process ID value stored in the event queue header of the particular queue, operation 172 can query the computing system to determine if this process ID is still active. If the process ID is no longer active, then operation 174 deletes the queue as shown in FIG. 9A.

In this manner, operations 170–174 can police and remove event queues which are no longer utilized by any active application program in the computing system. By deleting unneeded event queues, system resources of the computing system are used efficiently.

The invention has been described with regard to notifying application programs of events, changes of state, in storage devices. It will be apparent to one skilled in the art that the invention is easily incorporated into an operating system and can be responsive to any element in the computing system. Thus, the invention can provide event notification to application programs of changes of state of all devices in the computing system as well as storage devices.

While the invention has been particularly shown and described with reference to preferred embodiments thereof, it will be understood by those skilled in the art that various other changes in the form and details made by made therein without departing from the spirit and scope of the invention.

What is claimed is:

1. In a computer, an apparatus for notifying an application program of a change of state in a storage device, the computer having a processor, an input/output device, and the storage device, the storage device capable of correcting data errors before data is passed to the computer, said apparatus comprising:

an event queue storing an event generated by the storage device, said event corresponding to a data failure corrected within said storage device; and a notification module receiving said event from said storage device, said notification module placing said event in said event queue, and passing said event to the application program in response to a request from the application program for maintenance of the event queue.

2. The apparatus of claim 1, wherein said event queue comprises:

a queue header containing a queue name identifying the event queue, a maximum queue size, a set of queue flags, and a process identification that identifies the application program which requested the creation of the event queue.

3. The apparatus of claim 1, wherein said notification module receives application generated events corresponding to the configuration of the storage devices in the computing system.

4. In a computing system having a plurality of storage devices, a method for notifying an application program of a change of state in a storage device, the method comprising the steps of:

receiving a request for creation of an event queue from the application program;

responsive to said request, creating the event queue to store an event generated by the storage device corresponding to the change of state of the storage device, said event including a masked failure in a physical device of said storage device;

indicating to the application module that said event queue was successfully created;

receiving the event generated by the storage device, and placing said event in the event queue;

passing said event from the event queue to the application program;

determining if said application program has terminated; and responsive to said determining step, if said application program has terminated, deleting said event queue created by said creating step.

5. The method of claim 4, wherein said creating step further comprises the step of:

forming the event queue to have a queue header, said queue header containing a queue name identifying the event queue, a maximum queue size, a set of queue flags, and a process identifier identifying the application program which requested the creation of the event queue.

6. The method of claim 4, wherein said placing step further comprises:

determining if the event queue has exceeded a predetermined size limit, and if so, discarding an oldest event stored in the queue to create space for storing the event generated by the storage device.

7. The method of claim 4, wherein the placing step further comprises:

determining if the application program is waiting for the event, and if so, notifying said application program of the event.

8. The method of claim 4, wherein the passing step further comprises:

determining if the event queue has exceeded a predetermined size limit, and if so, reporting to the application program that information has been lost.

9. A computer program storage medium readable by a computing system and encoding a computer program of instructions for executing a computer process for notifying an application program of a change of state in a storage device, said computer process comprising the steps of:

receiving a request for creation of an event queue from the application program;

responsive to said request, creating the event queue to store an event generated by the storage, said event corresponding to a masked data failure within said storage device, said data failure being correctable by said storage device;

indicating to the application module that said event queue was successfully created;

receiving the event generated by the storage device, and placing said event in the event queue;

passing said event from the event queue to the application program;

determining if said application program has terminated; and responsive to said determining step, if said application program has terminated, deleting said event queue created by said creating step.

10. The computer program storage medium of claim 9, where, in the computer process, the computer program step of creating further comprises:

forming the event queue to have a queue header, said queue header containing a queue name identifying the event queue, a maximum queue size, a set of queue flags, and a process identifier identifying the application program which requested the creation of the event queue.

11. The computer program storage medium of claim 9, where, in the computer process, the computer program step of placing further comprises:

determining if the event queue has exceeded a predetermined size limit, and if so, discarding an oldest event stored in the queue to create space for storing the event generated by the storage device.

12. The computer program storage medium of claim 9, where, in the computer process, the computer program step of placing further comprises:

determining if the application program is waiting for the event, and if so, notifying said application program of the event.

13. The computer program storage medium of claim 9, where, in the computer process, the computer program step of passing further comprises:

determining if the event queue has exceeded a predetermined size limit, and if so, reporting to the application program that information has been lost.

* * * * *